United States Patent
Hashimoto et al.

(10) Patent No.: US 7,035,174 B2
(45) Date of Patent: Apr. 25, 2006

(54) OPTICAL DISC DRIVE AND OPTICAL PICKUP APPARATUS THAT CORRECT ASTIGMATISM

(75) Inventors: Minoru Hashimoto, Tokyo (JP); Tomohiko Baba, Chiba (JP)

(73) Assignee: Sony Corporation, (JP)

( * ) Notice: Subject to any disclaimer, the term of this patent is extended or adjusted under 35 U.S.C. 154(b) by 111 days.

(21) Appl. No.: 10/642,758

(22) Filed: Aug. 19, 2003

(65) Prior Publication Data

US 2004/0052172 A1    Mar. 18, 2004

Related U.S. Application Data

(63) Continuation of application No. 09/511,893, filed on Feb. 23, 2000, now Pat. No. 6,657,931.

(30) Foreign Application Priority Data

Feb. 25, 1999    (JP)    ............... P11-047422
Mar. 3, 1999     (JP)    ............... P11-055410

(51) Int. Cl.
    *G11B 7/00*    (2006.01)
(52) U.S. Cl. ............... 369/44.23; 369/44.37
(58) Field of Classification Search ............ 369/44.23, 369/44.37
    See application file for complete search history.

(56) References Cited

U.S. PATENT DOCUMENTS

| | | | |
|---|---|---|---|
| 3,752,559 A * | 8/1973 | Fletcher et al. ............ 359/503 |
| 4,733,067 A | 3/1988 | Oinoue et al. | |
| 4,873,429 A | 10/1989 | Kume et al. | |
| 5,018,123 A | 5/1991 | Hosoya et al. | |
| 5,073,884 A | 12/1991 | Kobayashi | |
| 5,289,313 A * | 2/1994 | Matsuoka ............ 369/112.28 |
| 5,546,364 A | 8/1996 | Fuji et al. | |
| 5,880,766 A | 3/1999 | Murakami et al. | |
| 5,986,996 A | 11/1999 | Kitamura et al. | |
| 6,072,579 A | 6/2000 | Funato | |
| 6,081,498 A | 6/2000 | Yoo et al. | |
| 6,085,005 A * | 7/2000 | Gates et al. ............ 385/88 |
| 6,088,170 A * | 7/2000 | Lee et al. ............ 359/710 |
| 6,151,154 A | 11/2000 | Ogasawara et al. | |
| 6,163,409 A | 12/2000 | Uchiyama et al. | |
| 6,181,666 B1 * | 1/2001 | Miyazaki et al. ...... 369/112.01 |
| 6,256,272 B1 | 7/2001 | Yoon | |
| 6,400,664 B1 * | 6/2002 | Shimano et al. ......... 369/44.37 |
| 6,424,605 B1 | 7/2002 | Iida | |
| 6,646,975 B1 * | 11/2003 | Uchizaki et al. ............ 369/121 |

FOREIGN PATENT DOCUMENTS

EP    0751 510 A2 *    2/1997    ............... 7/125
JP    08055357 A *    2/1996

* cited by examiner

*Primary Examiner*—Gautam R. Patel
(74) *Attorney, Agent, or Firm*—Rader, Fishman & Grauer PLLC; Ronald P. Kananen

(57) ABSTRACT

An optical disc drive compatible with optical discs of different types, for example, is provided. For focusing, through an optical system used in common with the different types of optical discs, a laser beam emitted from a selected one of a plurality of light sources disposed apart from each other radially of the optical disc, the optical system is moved radially of the optical disc correspondingly to the selection of the light source for emitting the laser light. Namely, it is possible to prevent the optical property from being deteriorated when a single optical pickup is used in common with such optical discs of different types.

12 Claims, 5 Drawing Sheets

OPTICAL DISC DRIVE AND OPTICAL PICKUP APPARATUS THAT CORRECT ASTIGMATISM

RELATED APPLICATION

This application is a continuation of application Ser. No 09/511,893, filed on Feb. 23, 2000 now U.S. Pat No. 6,657,931.

BACKGROUND OF THE INVENTION

1. Field of the Invention

The present invention relates to an optical disc drive, and more particularly to an optical disc drive adapted to write data to, and/or read data from, optical discs being different in format from each other, such as a compact disc (CD), digital video disc or digital versatile disc (DVD), etc. According to the present invention, a plurality of light sources is disposed apart from each other radially of such an optical disc and a laser light is emitted from one of the light sources selected according to the type of optical disc loaded in the optical disc drive towards the optical disc and focused through a common optical system for the different types of optical discs. Thus, a single optical pickup can be used in common with such a plurality of optical discs without any deterioration of the optical property.

2. Description of the Related Art

The conventional optical disc drive or CD player is adapted to irradiate a laser beam from an optical pickup onto an information recording surface of a CD and process a detection result of a return light from the CD surface to read or reproduce a variety of data recorded in the CD.

The conventional optical pickups include a type having a light source and photodetector disposed separately therein, and a type using an optical integrated device consisting integrally of a light source and photodetector. The U.S. Pat. Nos. 4,873,429 and 4,733,067 disclose examples of the construction of the optical pickups of the latter type. This type of optical pickup can be designed more compact and have a higher reliability.

It is considered that using such an optical integrated device to build the optical pickup also in an optical disc drive for DVD, a so-called DVD player, for example, the DVD player can be designed compact and simple. A DVD player designed to write data to, and/or read data from, a CD as well will be very conveniently usable.

In this case, by forming an optical integrated device integrally from a light source and photodetector for DVD and a light source and photodetector for CD, an optical disc player capable of writing data to, and/or reading data from, both CD and DVD can be provided.

When the optical integrated device is constructed as in the above and an objective lens is commonly used with both DVD and CD, either of the light source for DVD or that for CD will be disposed off the optical axis of the objective lens. The laser beam emitted from the light source thus disposed off the optical axis will be incident obliquely to the objective lens. As a result, the obliquely incident laser beam will have an increased aberration and thus the optical property will be deteriorated.

As defined in the standard, the pit depth in the compact disc (CD) is one eighth ($\lambda/8$) of the wavelength $\lambda$ of the laser beam irradiated to the CD, while the pit depth in the DVD is one fourth ($\lambda/4$) of the wavelength $\lambda$ of the laser beam irradiated to the DVD. Thus, in the DVD player, it is difficult to detect a tracking error signal by the similar method to that for CD. Namely, tracking error signal has to be produced by the so-called differential phase detection (DPD) method, for example. In this DPD method, the laser diode as light source has to be disposed in such a manner that the deflection plane of the laser beam will be parallel or perpendicular to the scanning direction of the laser beam.

For effective utilization of the internal space of the optical integrated device, the laser diode should desirably be disposed in such a manner that the deflection plane of the laser beam will be parallel or perpendicular to the direction of the optical path of the laser beam.

However, when the laser beam deflection plane is directed as in the above, the optical property of a read signal from the optical disc will be deteriorated.

OBJECT AND SUMMARY OF THE INVENTION

It is therefore an object of the present invention to overcome the above-mentioned drawbacks of the prior art by providing an optical pickup simply constructed and having a plurality of light sources selectively used to write data to, and/or read data from, an optical recording medium without any deterioration of optical property, and an optical disc drive using the optical pickup.

According to the present invention, there is provided an optical disc drive adapted to read information from an optical disc by emitting a laser beam from a selected one of a plurality of light sources disposed apart from each other radially of the optical disc and focusing the laser beam on the optical disc, detecting a return light resulted from reflection of the laser beam at the optical disc and processing the result of return light detection, the optical disc drive including:

a common optical system for irradiating the laser beam emitted from the selected one of the plurality of light sources to the optical disc; and a moving means operative in response to a laser beam output from the selected light source to move all or a part of the optical system radially of the optical disc.

According to the present invention, there is also provided an optical pickup adapted to irradiate a laser beam to an optical recording medium, detect a return light from the optical recording medium and providing a result of return light detection, the optical pickup including:

first and second light sources to emit the laser beams of different wavelengths, respectively;

a photodetector to detect the return light from the optical recording medium; and an optical system to converge the laser beam emitted from a selected one of the first and second light sources and guide the return light from the optical recording medium to the photodetector;

the first and second light sources being disposed so that the directions of the deformation, caused by the astigmatism, of the sectional shape of the laser beams emitted from the light sources will nearly coincide with each other; and the optical system being adapted for common use with the laser beams emitted from the first and second light sources, and including an astigmatism correcting means for common use with the laser beams emitted from the first and second light sources.

According to the present invention, there is also provided an optical disc drive adapted to read information from an optical disc by emitting a laser beam from a selected one of a plurality of light sources disposed apart from each other radially of the optical disc and focusing the laser beam on the optical disc, detecting a return light resulted from reflection of the laser beam at the optical disc and processing the result of return light detection, the optical disc drive including:

first and second light sources to emit the laser beams of different wavelengths, respectively;

a photodetector to detect the return light from the optical recording medium; and an optical system to converge the laser beam emitted from a selected one of the first and second light sources and guide the return light from the optical recording medium to the photodetector;

the first and second light sources being disposed so that the directions of the deformation, caused by the astigmatism, of the sectional shape of the laser beams emitted from the light sources will nearly coincide with each other; and the optical system being adapted for common use with the laser beams emitted from the first and second light sources, and including an astigmatism correcting means for common use with the laser beams emitted from the first and second light sources.

These objects and other objects, features and advantages of the present intention will become more apparent from the following detailed description of the preferred embodiments of the present invention when taken in conjunction with the accompanying drawings.

BRIEF DESCRIPTION OF THE DRAWINGS

DETAILED DESCRIPTION OF THE PREFERRED EMBODIMENTS (1) Overall Construction of an Embodiment Referring now to FIG. 1, there is schematically illustrated an embodiment of the optical disc drive according to the present invention. The optical disc drive is generally indicated with a reference 1. In FIG. 1, first and second types of optical disc are shown. The first optical disc is a DVD indicated with a reference 2A and the second optical disc is a CD indicated with a reference 2B. The optical disc drive 1 reads data recorded in the DVD 2A and also data recorded in the CD 2B. These optical discs 2A and 2B are shown together in FIG. 1 for the convenience of illustration and description of the optical disc drive 1.

The CD 2B is an optical disc from which recorded data can be read by irradiating a laser beam to an information recording surface of the disc through a transparent substrate of 1.2 mm in thickness and processing a return light from the information recording surface. The DVD 2A is an optical disc having information recorded therein with a higher density than the CD 2B and from which recorded data can be read by irradiating a laser beam to an information recording surface of the disc through a transparent substrate of 0.6 mm in thickness and processing a return light from the information recording surface.

Figure 1:
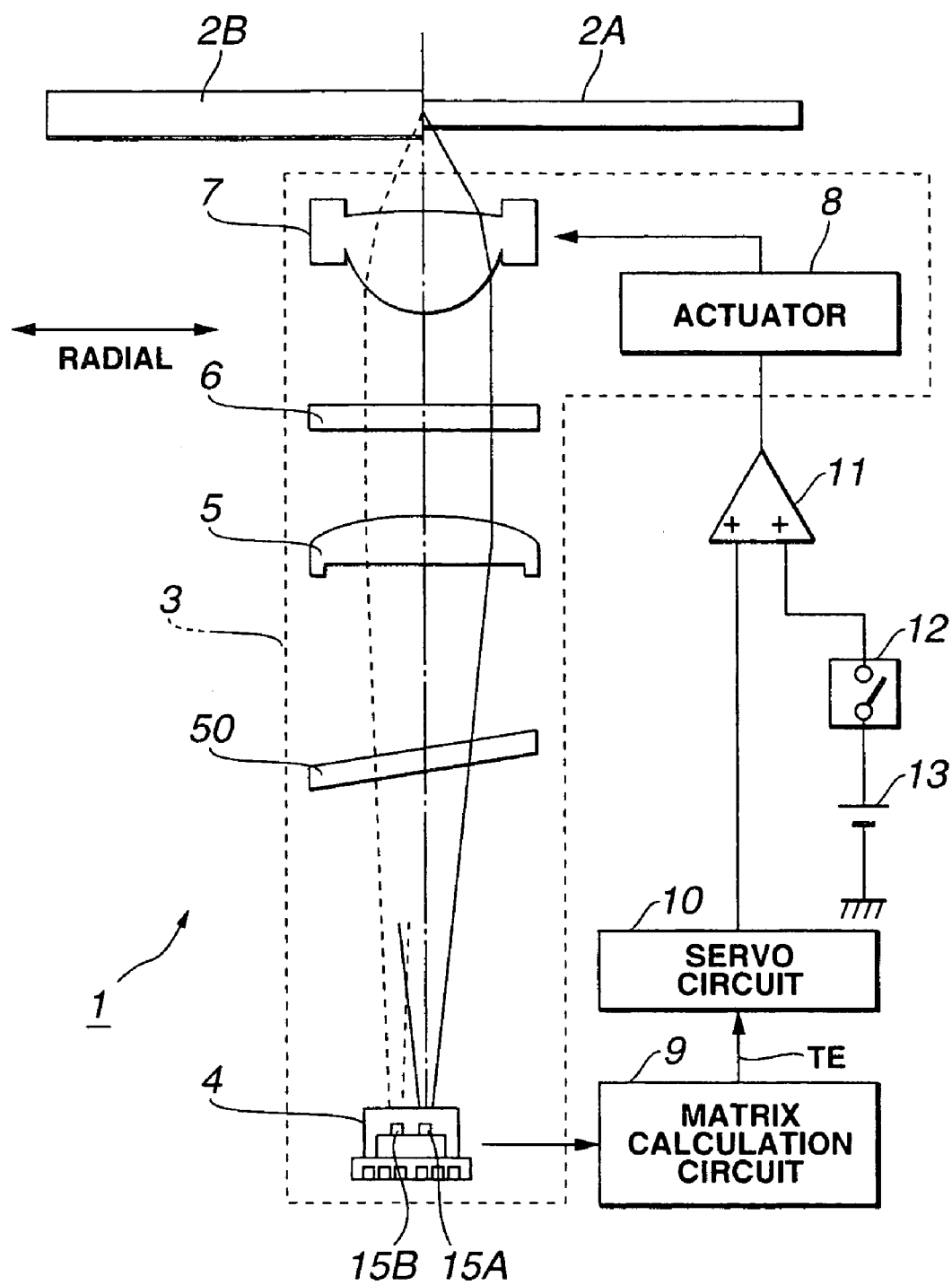
FIG. 1 is a schematic diagram of the optical disc drive according to the present invention.

In this optical disc drive 1, an optical pickup 3 is disposed to be movable radially of the optical disc by a predetermined sled mechanism. As shown in FIG. 1, the optical pickup 3 consists of an astigmatism correction plate 50, collimator lens 5, aperture 6 and an objective lens 7. A laser beam emitted from an optical integrated device 4 is irradiated to the optical disc 2A or 2B through the astigmatism correction plate 50, collimator lens 5, aperture 6 and objective lens 7. On the contrary, a return light from the optical disc 2A or 2B is incident upon the optical integrated device 4 through the objective lens 7, aperture 6, collimator lens 5 and astigmatism correction plate 50.

The optical disc drive 1 processes a result of the detection of the return light by the optical integrated device 4 to produce a tracking error signal, focus error signal and a read signal. The optical disc drive 1 moves the objective lens 7 based on the tracking and focus error signals to control the tracking and focus, and processes the read signal to reproduce data recorded in the optical disc 2A or 2B.

The optical integrated device 4 is formed from a light source and photodetector for CD and a light source and photodetector for DVD both integrally disposed in one package. The optical integrated device 4 has two semiconductor laser diode chips for the light sources, respectively, disposed about 100 μm apart from each other radially of the optical disc 2A or 2B. These semiconductor laser diode chips are selectively driven under the control of a system controller (not show) depending upon which is currently used, the optical disc 2A or 2B. Thus, the optical integrated device 4 selectively emits a laser beam of a wavelength corresponding to the optical disc 2A or 2B towards the optical disc 2A or 2B, and a return light from the optical disc 2A or 2B is detected by a corresponding photodetector.

The astigmatism correction plate 50 is a transparent parallel flat plate and it is disposed in the optical path of the laser beam and obliquely in relation to the optical axis of the laser beam. The astigmatism correction plate 50 is equal in astigmatism to the laser beam. Its gradient, thickness, etc. are selected to provide an astigmatism which will cancel that of the laser beam. Thus, the astigmatism correction plate 50 corrects the astigmatism of each of the laser beams which are different in wavelength from each other.

The collimator lens 5 converts the laser beam emitted from the optical integrated device 4 and having passed through the astigmatism correction plate 50 to a nearly parallel beam. Note that the collimator lens 5 is so disposed in relation to the optical integrated device 4 that the optical axis thereof aligns with that of the DVD laser beam. Thus, the collimator lens 5 has the optical axis thereof not aligned with the optical axis of the CD laser beam.

Figure 2:
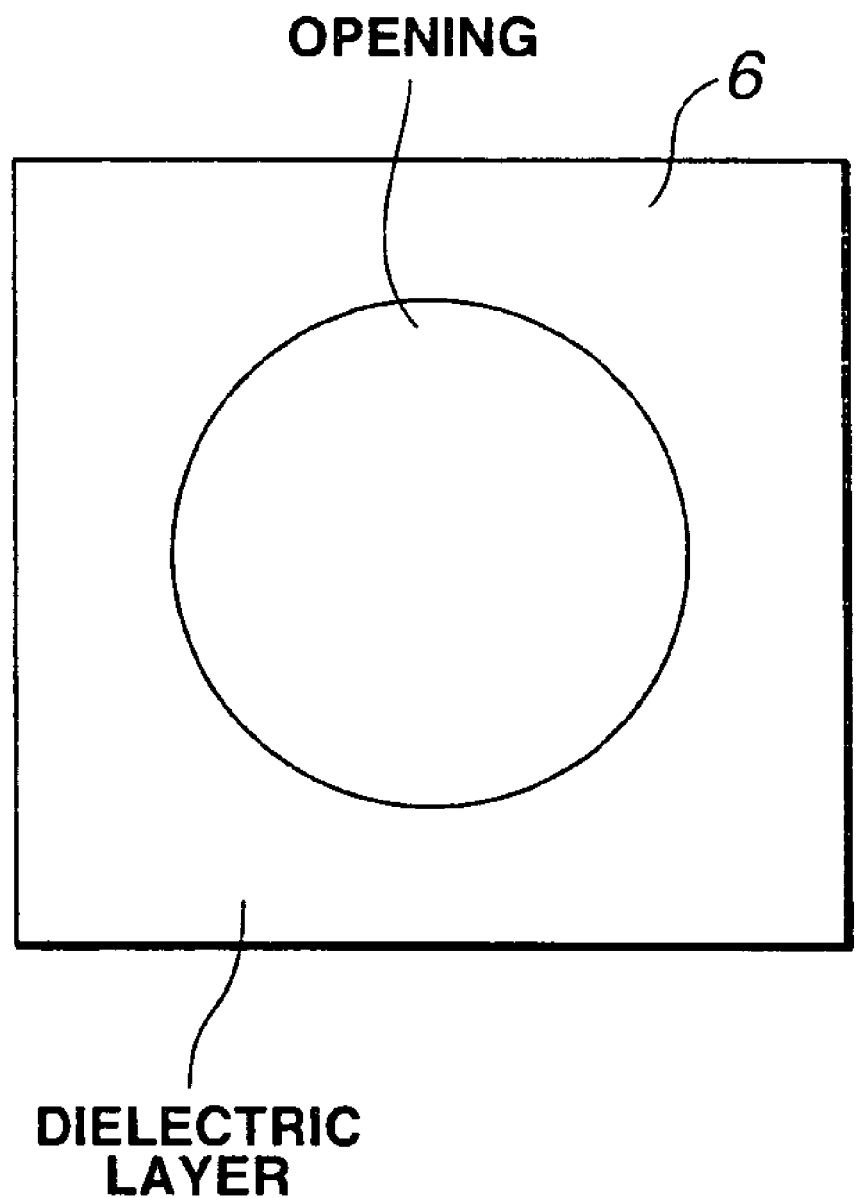
FIG. 2 is a plan view of an aperture of an optical pickup in FIG. 1.

As shown in FIG. 2, the aperture 6 is a transparent plate with a dielectric layer evaporated thereon and a circular opening formed in the center thereof Namely, the aperture 6 has the dielectric layer around the central opening formed therein. The dielectric layer serves as a filter to selectively intercept a laser beam of 780 nm in wavelength for CD while allowing a laser light of 650 nm in wavelength for DVD to penetrate through it. Thus, the aperture 6 will shape the incident laser beam for CD to be a beam having a diameter depending upon the diameter of the opening, while allowing the laser beam for DVD to pass through the aperture 6 with the shape thereof not changed at all. Note that the aperture 6 is so disposed that the center of the opening formed therein will nearly coincide with the optical axis of the CD laser beam.

The objective lens 7 is an aspheric plastic lens formed from a transparent resin by injection molding. By selecting an appropriate refractive index of the transparent resin and shape of the lens surface, the objective lens 7 is formed to focus the incident parallel laser beam for DVD or CD onto the information recording surface of the optical disc 2A or 2B. Thus, the objective lens 7 is formed as a so-called bifocal lens for both the laser beams for DVD and CD, respectively.

Further, the objective lens 7 is movable by a tracking control actuator 8 composed of a voice-coil motor radially of the optical disc 2A or 2B so that tracking control can be done by driving the actuator 8 corresponding to a tracking error signal.

Also, the objective lens 7 is movable by a focus control actuator (not shown) along the optical axis of the laser beam so that focus control can be done by driving the focus control actuator corresponding to a focus error signal.

When not forced by the tracking control actuator 8, the movable objective lens 7 will be positioned for the optical axis thereof to be aligned with that of the DVD laser beam while the optical axis of the objective lens 7 will not be aligned with that of the CD laser beam. When reading the CD 2B, the objective lens 7 is moved by the tracking control actuator 8 radially of the CD 2B corresponding to the spacing between the light sources in the optical integrated device 4, whereby the optical property of the optical system is prevented from being deteriorated when reading the CD 2B.

The optical disc drive 1 further comprises a matrix calculation circuit 9 as shown in FIG. 1. The matrix calculation circuit 9 provides a matrix calculation of a result of the light detection output from the optical integrated device 4 to produce a tracking error signal TE whose level varies depending upon the magnitude of a tracking error, focus error signal whose level varies depending upon the magnitude of a focus error, and a read signal whose level varies depending upon the pit train. The matrix calculation circuit 9 produces a tracking error signal, focus error signal and read signal for each of DVD and CD.

For the tracking control, the optical disc drive 1 further includes a servo circuit 10 and drive circuit 11. The servo circuit 10 produces a drive signal for use to enable a predetermined level of the tracking error signal TE, and the drive circuit 11 drives the actuator 8 under the drive signal.

As shown in FIG. 1, the optical disc drive 1 further comprises a switching circuit 12. For reading the CD 2B, the switching circuit 12 will be closed under the control of the system controller to provide a predetermined offset voltage to the drive circuit 11 which in turn will add the offset voltage to a drive signal provided from the servo circuit 10, and thus drive the actuator 8. In this optical disc drive 1, tracking control is made with the objective lens 7 moved radially of the CD 2B.

(2) Construction of the Optical Integrated Device 4

Figure 3A:
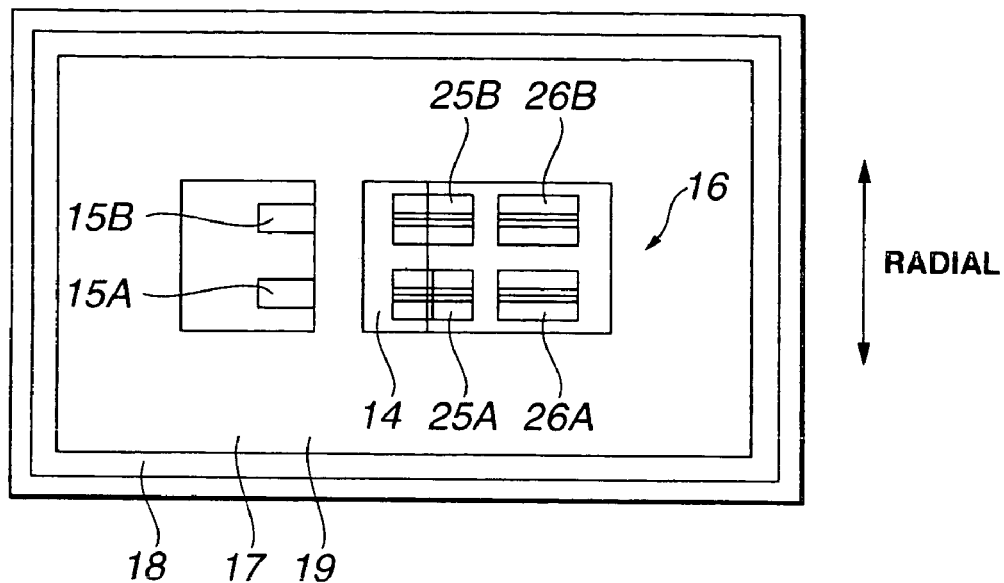
FIG. 3A is a plan view.
Figure 3B:
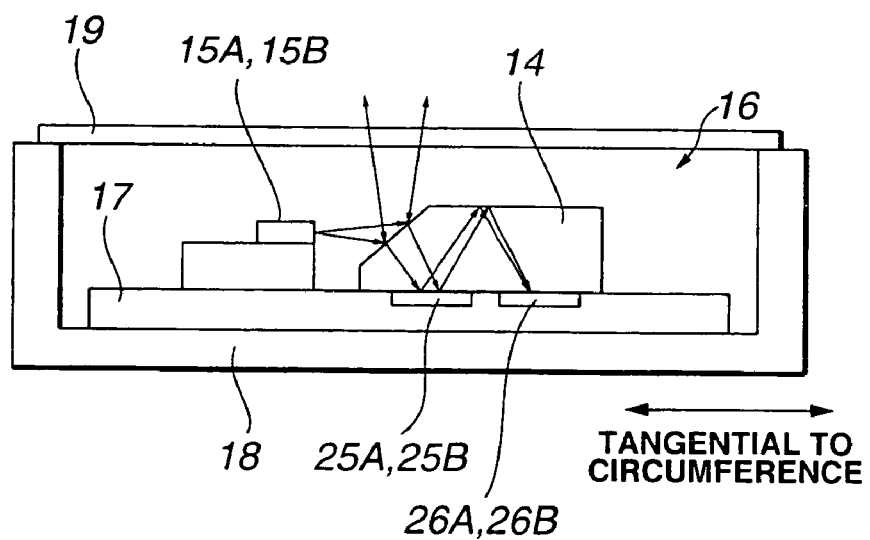
FIG. 3B is a sectional view, of the optical integrated device included in the optical pickup in FIG. 2.

FIG. 3A is a plan view, from the emitted direction of the laser beam, of the optical integrated device 4, and FIG. 3B is a sectional view, taken along the direction tangential to the circumference of the optical disc 2A or 2B, of the optical integrated device 4. The optical integrated device 4 is constructed by disposing a prism 14, and semiconductor laser diode chips 15A and 15B on a semiconductor substrate 17 to form an optical system 16, putting the optical system 16 in a package 18 and wiring it, and then sealing the package 18 with a transparent glass 19.

The semiconductor laser diode chips 15A and 15B are disposed apart by about 100 µm from each other radially of the optical disc 2A or 2B and emit a laser beam having a wavelength of 650 nm for DVD and a laser beam having a wavelength 780 nm for CD, respectively, towards the prism 14. Also, the semiconductor laser diode chips 15A and 15B are disposed for the deflection plane to be parallel or perpendicular to the scanning direction of the laser in the light-incident surface of the optical disc 2A or 2B. Further, the semiconductor laser diode chips 15A and 15B in pair are nearly equal in astigmatism to each other. They are disposed so that the section of the laser beam will be deformed by the astigmatism in the same direction. Thus, in the optical disc drive 1, the single astigmatism correction plate 50 corrects the astigmatism of each of the laser beams emitted from the two light sources. When reading a DVD, a tracking error signal can be detected by the DPD (differential phase detection) method.

The prism 14 is provided to separate the laser beam and return light from each other. It is formed to have a generally rectangular shape having a slope at one lateral side thereof. Thus, a laser beam emitted from the semiconductor laser diode chip 15A or 15B is reflected at the slope of the prism 14 towards the collimator lens 5, and a return light having traveled reversely along the optical path of the laser beam and incident upon the prism 14 is guided inwardly of this slope.

At the prism 14, the return light incident upon the slope is incident upon the bottom of the prim 14. About 50% of the return light is penetrated through the prism bottom while the remainder is reflected towards the top of the prims 14. The return light incident upon the prism top is reflected nearly 100% there towards the prism bottom and allowed to outgo through the prism bottom.

For the above reflection of the return light, the prism 14 has a mirror surface formed by evaporation on the top thereof. Also the prims 14 has a beam splitting surface formed on a portion of the bottom thereof at the slope side (will be referred to as "front side" hereinafter) and a light transmissive surface formed on a portion of the bottom thereof at the side away from the slope (will be referred to as "rear side" hereinafter) so that the ratio in amount between the return light allowed to outgo through the prism bottom at the front-side portion and that allowed to outgo through the prism bottom at the rear-side portion will be nearly 1:1. The beam splitting surface and light-transmissive surface are formed by the similar evaporation to that used in forming the mirror surface.

The semiconductor substrate 17 has light-incident surfaces 25A and 26A for DVD and light-incident surfaces 25B and 26B for CD formed on portions, respectively, thereof upon which the return portion of the laser beam for DVD and that of the laser beam for CD are incident from the prism 14.

The light-incident surfaces 25A and 25B are disposed correspondingly to the front-side portion of the prism 14, while the light-incident surfaces 26A and 26B are disposed correspondingly to the rear-side portion.

Figure 4:
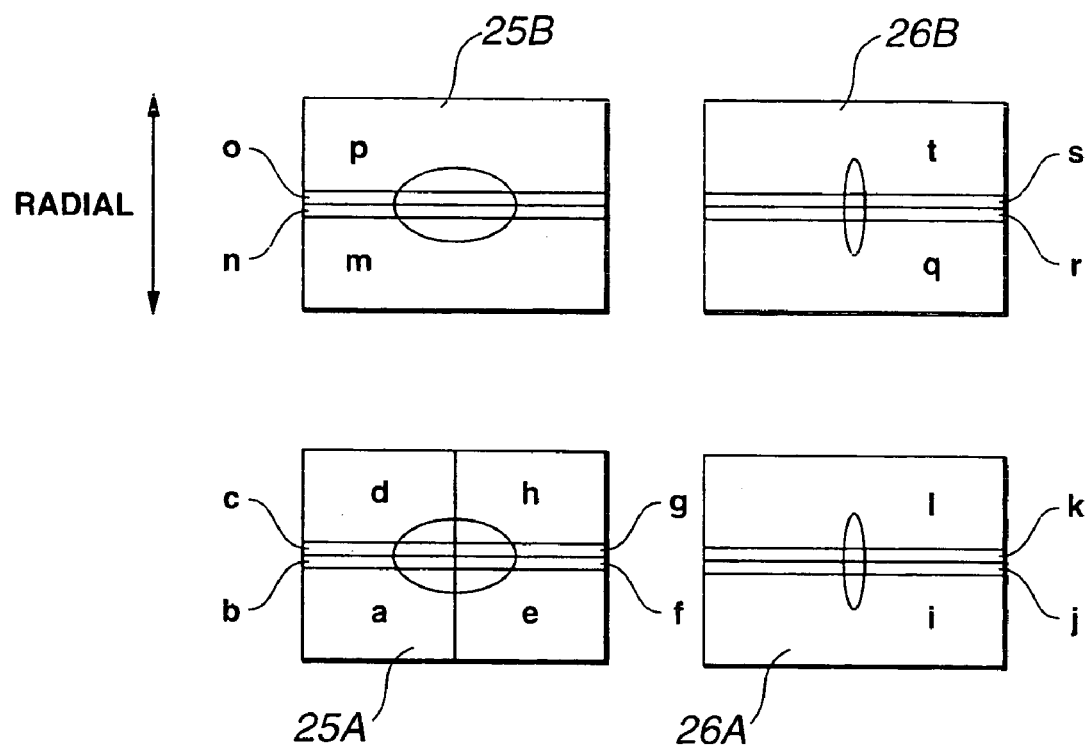
FIG. 4 is a plan view, enlarged in scale, of the light-incident surfaces of the optical integrated device in FIG. 3.

FIG. 4 is a plan view, partially enlarged in scale, of the light detection systems for CD and DVD, respectively, formed from the above-mentioned light-incident surfaces of the optical integrated device 4. For the optical integrated device 4, the directions of the semiconductor laser diode chips 15A and 15B and size of the prism 14 are selected so that when the laser beam is just focused, a beam spot defined on the semiconductor substrate 17 by the return light having passed through the prism 14 will be formed, at the rear-side portion, like a focal line, and at the front-side portion, like an ellipse having the major axis thereof directed perpendicularly to the extension of the focal line at the rear-side portion.

The light-incident surfaces 25B and 26B for the CD are formed side by side tangentially to the circumference of the CD to have a general shape of a rectangle, and each is divided radially of the CD by a parting line extending tangentially to the circumference of the CD. Thus, when the optical head is just on an intended track on a CD, each of the light-incident surfaces 25B and 26B can detect a beam spot defined thereon and quartered radially of the CD. Namely, a result of light detection by each of the quartered light-incident surfaces is provided as output. In FIG. 4, the outer light-incident surface divisions at the front-side portion are indicated with references m and p, respectively, while the inner ones are indicated with references n and o, respectively. The outer light-incident surface divisions at the rear-side portion are indicated with references q and t, respectively, while the inner ones are indicated with references r and s, respectively.

The light-incident surfaces 25A and 26A for DVD are formed side by side tangentially to the circumference of the optical disc 2A in the similar manner to that for the light-incident surfaces 25B and 26B to have a general shape of a rectangle. The light-incident surface 26A at the rear-side portion is formed similarly to the light-incident surface 26B at the rear-side portion for the CD.

The light-incident surface 25A at the front-side portion is formed similarly to the light-incident surface 25B at the front-side portion for the CD, and further it is divided by two tangentially to the circumference of the optical disc. Thus, the semiconductor substrate 17 can produce a tracking error signal by the so-called differential phase detection (DPD). As shown in FIG. 4, the outer and on-slope light-incident surface divisions for DVD at the front-side portion are indicated with references a and d, respectively, and the inner and under-slope light-incident surface divisions at the front-side portion are indicated with references b and c, respectively. Further, the outer and off-slope light-incident surface divisions at the front-side portion are indicated with references e and h, respectively, and the inner and off-slope light-incident surface divisions at the front-side portion are indicated with references f and g, respectively. Also, the outer light-incident surface divisions at the rear-side portion are indicated with references i and I, respectively, and the inner light-incident surface divisions at the rear-side portion are indicated with references j and k, respectively.

The semiconductor substrate 17 converts the results of light detection from the light-incident surface divisions a to t from current to voltage, then calculates the converted signals and provide the results of calculation to the matrix calculation circuit 9 where the calculated signals will further be calculated to produce a tracking error signal, focus error signal and a read signal.

When reading a CD, the results of light detection are processed as follows. Differences in light detection are detected between the inner and outer light-incident surface divisions of each of the front- and rear-side light-incident surfaces 25B and 26B, and then a subtraction between the differences is made between the front- and rear-side light surfaces 25B and 26B to produce a focus error signal expressed by (m+p+r+s)−(n+o+q+t). Differences in light detection are detected between the inner and outer circumferential light-incident surface divisions of each of the front- and rear-side light-incident surfaces 25B and 26B, and then a subtraction between the differences is made between the front- and rear-side light surfaces 25B and 26B to produce a tracking error signal expressed by (m+n+s+t)−(o+p+q+r). Then all the results of light detection at the front- and rear-side light-incident surfaces 25B and 26B are added together to produce a read signal expressed by (m+n+o+p+q+r+s+t).

Figure 5:
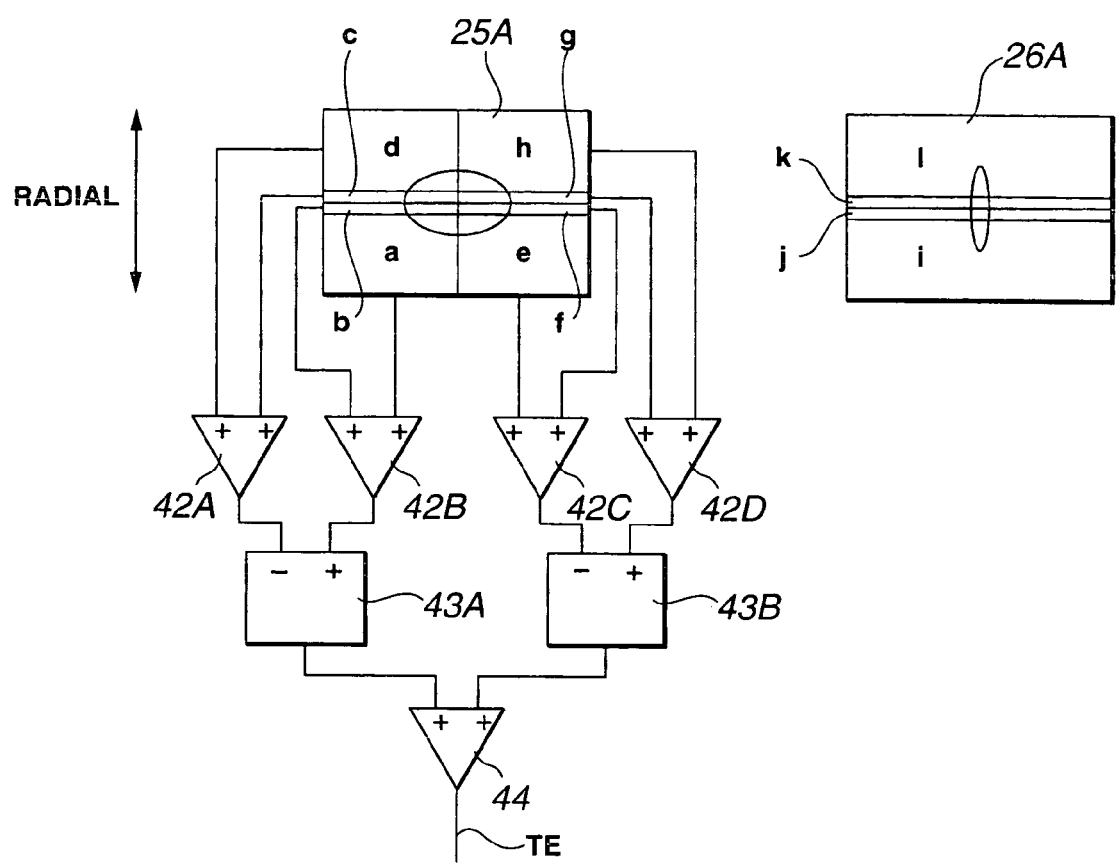
FIG. 5 is a schematic diagram explaining how to process results of light detection by the light-incident surfaces shown in FIG. 4.

When reading a DVD, the results of light detection are processed in the same manner as in the above for reading a CD to produce a focus error signal expressed by (a+b+e+h+j+k)−(b+c+f+g+i+l) and a read signal expressed by (a+b+c+d+e+f+g+h+i+j+k+l+). On the other hand, for production of the tracking error signal TE for DVD, results of light detection are processed as follows. As shown in FIG. 5, results of light detection from two light-incident surfaces corresponding to the inner and outer circumferences of the optical disc 2A are added together by addition circuits 42A to 42D for each of the groups of light-incident surface divisions defined in the direction of the light-incident surfaces 25A and 26A disposed side by side. Thus quantities of light incident upon the inner and outer circumferential-side light-incident surface divisions are determined for each group. For each of the groups, results of light detection are compared in phase between the groups of the inner and outer circumferential-side light-incident surface divisions by phase comparison circuits 43A and 43B, and then added together by an addition circuit 44 to produce a tracking error signal TE.

(3) Operation of the Embodiment

In the optical disc drive 1 constructed as having been described in the foregoing with reference to FIG. 1, the optical pickup 3 irradiates a laser beam to the optical disc 2A or 3B and detects a return light from the optical disc, and a selected one of the signal processing circuits processes the result of the return light detection, thereby reading information from the optical disc 2A or 2B.

More particularly, a laser beam is emitted from the optical integrated device 4 of the optical pickup 3 incorporated in the optical disc drive 1, converted to a nearly parallel beam by the collimator lens 5, passed through the aperture 6, and guided to the objective lens 7 which will focus the laser beam on an information recording surface of the optical disc 2A or 2B. A return light resulted from reflection of the laser beam at the information recording surface is passed through the objective lens 7 and incident upon the optical integrated device 4 which provides results of return light detection as outputs.

In the optical disc drive 1, the tracking error signal TE is produced by processing the results of return light detection as in the above, and the objective lens 7 is moved by the servo circuit 10 radially of the optical disc 2A or 2B until the tracking error signal TE gets a predetermined signal level. Namely, a tracking control is made. Similarly, a focus error signal is produced, and the objective lens 7 is moved up and down until the focus error signal has a predetermined level. This is the focus control according to the present invention.

When the optical disc (2A or 2B) loaded in the optical disc drive 1 is a DVD namely, 2A), one of the semiconductor laser diode chips 15A and 15B disposed side by side in the optical integrated device 4 radially of the optical disc 2A or 2B (see FIG. 3), that is, the semiconductor laser diode chip 15A, is selected to emit a laser beam towards the DVD 2A, and a return light from the DVD 2A is detected by the light-incident surfaces 25A and 26A for the DVD via the prism 14.

Since the optical pickup 3 is disposed so that the optical axes of the objective lens 7 and collimator lens 5 are generally aligned with that of the DVD laser beam, the optical property can effectively be prevented from being deteriorated.

On the contrary, when the optical disc loaded in the optical disc drive 1 is the CD (namely, 2B), the semiconductor laser diode chip 15B (see FIG. 3) is selected to emit a laser beam towards the CD 2B, and a return light from the CD 2B is detected by the light-incident surfaces 25B and 26B for the CD via the prism 14.

In the optical disc drive 1, the switching circuit 12 is closed, so that an offset voltage is added to the drive signal supplied from the servo circuit 10 for moving the objective lens 7 over a predetermined distance radially of the CD 2B (tracking control). Thus, in the optical disc drive 1, the aberration developed during read of the CD 2B can be reduced to prevent the optical property from being deteriorated.

The deteriorations of optical property were actually observed using various signals produced by the matrix calculation circuit 9. As the results of the observation showed that when the objective lens 7 is not moved at all, there took place in the tracking error signal TE a deviation of the S-characteristic from the one for the just tracking. When the collimator lens 5 had a focal distance of 23 mm and a distance of 6.176 mm was provided between the collimator lens 5 and objective lens 7, the deviation of the S-characteristic from the just-tracking one could be prevented by moving the objective lens 7 towards the semiconductor laser diode chip for the CD.

The moving distance of the objective lens 7 varies in proportion to the ratio between the focal distance of the collimator lens 5 and the distance between the collimator 5 and objective lens 7. By increasing the distance between the collimator lens 5 and objective lens 7 in comparison with the focal distance of the collimator lens 5, the objective lens 7 can be moved away from the semiconductor laser diode chip for the CD, so that the deviation of the S-characteristic from the just-tracking one can be prevented. Also, when the focal distance of the collimator lens 5 is set equal to the distance between the collimator lens 5 and objective lens 7, it is possible to prevent the S-characteristic from deviating from the just-tracking one without the necessity of moving the objective lens 7. In this case, however, the design of the objective lens 7 being a bifocal lens will be complicated.

(4) Effect of the Embodiment

To prevent the deterioration of the optical property by moving the objective lens 7, the semiconductor laser diode chips 15A and 15B are disposed side by side radially of the optical disc 2A or 2B in the present invention. So the tracking control actuator can be used to easily move the objective lens 7. That is, according to the present invention, the optical pickup 3 may be designed simple for moving the objective lens 7 to prevent the optical property from being deteriorated. The optical pickup 3 may be nearly the same in construction as for a compact disc.

Note that the laser beam for the CD is focused on the compact disc 2B with the diameter thereof limited and the numerical aperture reduced by the aperture 6.

The return light resulted from reflection of the laser irradiated to an optical disc is incident upon the light-incident surfaces 25A and 26A for the DVD and those 25B and 26B for the CD (as in FIG. 4), and the results of light detection from the light-incident surfaces 25A and 26B are processed depending upon whether the optical disc being played is 2A or 2B, thereby reading the DVD or the CD.

In the above optical disc drive 1, one of the semiconductor laser diode chips 15A and 15B disposed apart from each other radially of the optical disc is selected to emit a laser beam, and focused on the optical disc 2A or 2B through the common optical system (including the elements 5, 6 and 7). At this time, the objective lens 7 forming a part of the optical system is moved radially of the optical disc for alignment with the laser beam emitted from the selected light source. Thus, when the single optical pickup 3 is used in common with the plurality of optical discs, it is possible to prevent the optical property from being deteriorated.

In the foregoing, the prevent invention has been described concerning the embodiment in which only the objective lens is moved. However, the present invention is not limited to this embodiment but the entire optical system may be adapted to be movable.

Also, in the optical disc drive 1 according to the present invention, the astigmatism correction plate 50 made of a transparent parallel flat plate is disposed obliquely in the optical path of the laser beam to correct the astigmatism of the laser beam emitted from a selected one of the light sources in reading the optical disc 2A or 2B.

For the astigmatism correction, there is disposed in the optical disc drive 1 the pair of the semiconductor laser diode chips 15A and 15B nearly equal in astigmatism to each other in such a manner that the deflection plane on the disc surface is parallel or perpendicular to the scanning direction of the laser beam and the sections of the laser beams are deformed in the nearly same direction by the astigmatism. Therefore, the single astigmatism correction plate 50 can be used in common with the two laser beams to correct the astigmatism of each of the laser beams. Thus, the simple design of the optical disc drive 1 improves the optical property.

As mentioned above, the semiconductor laser diode chips 15A and 15B can be disposed in the optical disc drive 1 for the laser beam deflection plane to be parallel or perpendicular to the scanning direction of the laser beam, and the tracking error signal for DVD can be produced by the DPD method. Also, the internal space of the optical integrated device 4 can effectively be utilized to enable a compact design of the optical integrated device 4.

Owing to the above-mentioned construction of the optical disc drive 1, a laser beam can be emitted from a selected one of the semiconductor laser diode chips disposed apart from each other radially of the optical disc, and focused on the optical disc via the common optical system. In this light generation and guiding, the single astigmatism correcting means can be used to correct the aberration of the laser beam. Thus, the simple design of the optical disc drive 1 will lead to an improvement of the optical property.

The present invention has been described in the foregoing concerning the embodiment in which the transparent parallel flat plate is used as the astigmatism correcting means. However, the present invention is not limited to this embodiment, but the astigmatism may be formed from a cylindrical lens, hologram, Fresnel lens or the like. When a coupling lens is used, the astigmatism correcting means may be formed on the coupling lens.

(5) Other Possible Embodiments

In the foregoing, the present invention has been described concerning the embodiment in which light-incident surfaces are formed in the optical system for each of the types of optical discs. However, the present invention is not limited to this embodiment but all or a part of the optical system may be constructed for common use with the different types of optical discs.

The present invention has been described in the foregoing concerning the embodiment adapted to be compatible with both a CD and DVD. However, the present invention is not limited to this embodiment, but can be adapted to be compatible with both a CD and a recordable compact disc such as CD-R.

The present invention has been described concerning the embodiment in which two different types of optical disc are read by the single optical pickup. However, the present invention is not limited to this embodiment, but can be adapted to read more than two types of optical disc.

The present invention has been described in the foregoing as to the embodiment in which the optical pickup is constructed from the optical integrated device formed integrally from a light source and photodetector. However, the present invention is not limited to this embodiment, but it can be adapted such that the light source and photodetector are disposed separately from each other.

As having been described in the foregoing, the optical disc drive according to the present invention is adapted such that when a laser beam is emitted from a selected one of a plurality of light sources disposed apart from each other radially of optical discs and focused on the optical disc via a common optical system, the optical system is moved radially of the optical disc correspondingly to the selected light source, thereby permitting to prevent the optical property from being deteriorated when one optical pickup is used in common with the plurality of optical discs.

Also according to the present invention, the single astigmatism correcting means is used to correct the aberration of more than one laser beams, so that a simple construction of the optical disc drive assures an improved optical property when one of a plurality of light sources is used to read one of a plurality of optical recording media.

What is claimed is:

1. An optical pickup adapted to irradiate a laser beam to an optical recording medium, detect a return light from the optical recording medium and providing a result of return light detection, the optical pickup comprising:

first and second light sources that emit laser beams of different wavelengths, respectively;

a photodetector that detects the return light from the optical recording medium; and an optical system that converges the laser beam emitted from a selected one of the first and second light sources onto the optical recording medium and guides a return light from the optical recording medium to the photodetector; and wherein the first and second light sources are disposed so that the laser beam emitted from the first light source and the laser beam emitted from the second light source are deformed in the same direction, and wherein the optical system includes an astigmatism correcting means for correcting astigmatism associated with the laser beams emitted from both the first and second light sources.

2. The optical pickup as set forth in claim 1, wherein the astigmatism correcting means is a transparent parallel flat plate.

3. The optical pickup as set forth in claim 1, wherein the first and second light sources are nearly equal in astigmatism to each other.

4. The optical pickup as set forth in claim 1, wherein the first and second light sources and the photodetector are provided integrally in one package.

5. The optical pickup as set forth in claim 1, wherein the laser beams from the first and second light sources are different in wavelength from each other.

6. An optical disc drive adapted to read information from an optical disc by emitting a laser beam from a selected one of a plurality of light sources disposed apart from each other radially of the optical disc and focusing the laser beam on the optical disc, detecting a return light resulted from reflection of the laser beam at the optical disc and processing the result of return light detection, the optical disc drive including:

first and second light sources that emit laser beams of different wavelengths, respectively;

a photodetector that detects the return light from an optical recording medium;

an optical system that converges the laser beam emitted from a selected one of the first and second light sources and guides the return light from the optical recording medium to the photodetector, wherein the first and second light sources are disposed so that the laser beam emitted from the first light source and the laser beam emitted from the second light source are deformed in the same direction, and wherein the optical system includes an astigmatism correcting means for use with the laser beams emitted from the first and second light sources.

7. The optical disc drive as set forth in claim 6, wherein the astigmatism correcting means is a transparent parallel flat plate.

8. The optical disc drive as set forth in claim 6, wherein the first and second light sources are nearly equal in astigmatism to each other.

9. The optical disc drive as set forth in claim 6, wherein the first and second light sources and the photodetector are provided integrally in one package.

10. The optical disc drive as set forth in claim 6, wherein the photodetector has a light-incident surface divided in a first direction corresponding to the scanning direction of a laser beam and in a second direction perpendicular to the first direction and thus provides results of light detection from these light-incident surface divisions.

11. The optical disc drive as set forth in claim 6, wherein the first and second light sources are disposed so that a deflection plane of the optical disc drive is parallel or perpendicular to a scanning direction of the laser beams emitted out the surface of the optical disc.

12. The optical disc drive as set forth in claim 6, wherein the laser beams from the first and second light sources are different in wavelength from each other.

* * * * *